(No Model.)

J. FRYE.
VALVE.

No. 523,855. Patented July 31, 1894.

WITNESSES:
Frank J. Busser
M. H. Ellis.

INVENTOR:
James Frye
by his atty
G. J. Harding

THE NORRIS PETERS CO., PHOTO-LITHO., WASHINGTON, D. C.

UNITED STATES PATENT OFFICE.

JAMES FRYE, OF PHILADELPHIA, PENNSYLVANIA.

VALVE.

SPECIFICATION forming part of Letters Patent No. 523,855, dated July 31, 1894.

Application filed January 5, 1894. Serial No. 495,788. (No model.)

*To all whom it may concern:*

Be it known that I, JAMES FRYE, a citizen of the United States, residing at Philadelphia, county of Philadelphia, and State of Pennsylvania, have invented a new and useful Improvement in Valves, of which the following is a full, clear, and exact description, reference being had to the accompanying drawings, which form a part of this specification.

The object of my invention is to produce a new valve for pipes. It is designed to be especially applicable to pipes leading from hot and cold water reservoirs to sinks, wash basins, &c., and also to discharge pipes leading therefrom.

A further object is to produce a valve which may be advantageously placed in a pipe in which there is a strong upward pressure of water.

A further object is to so construct the valve that the force of a stream of water passing through the pipe will be abated before reaching its outlet.

Figure 1:
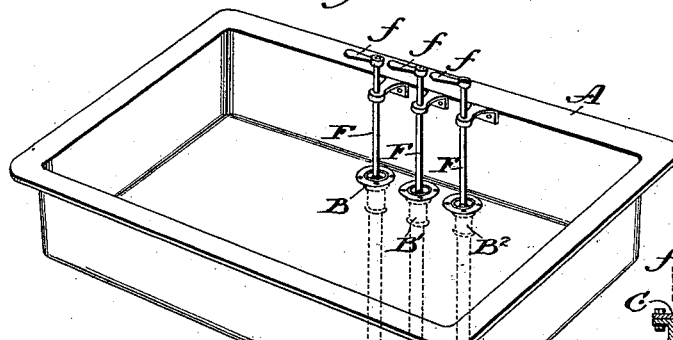
Figure 2:
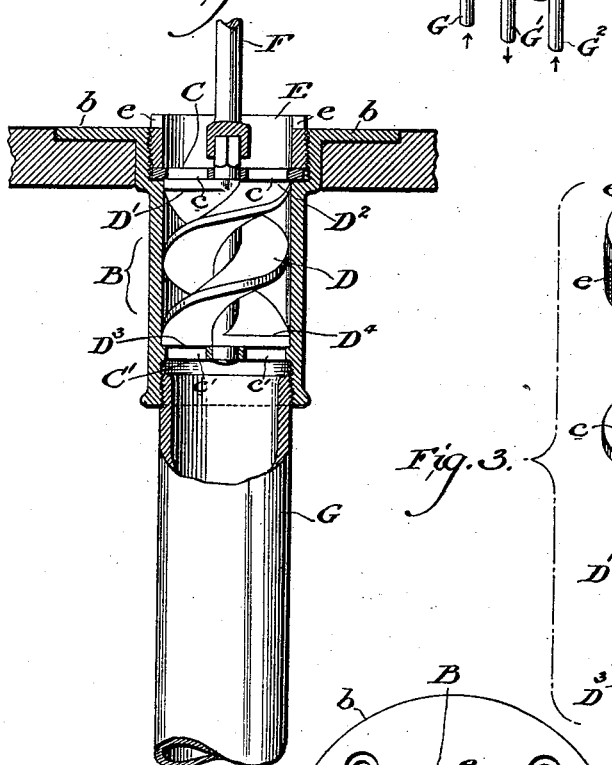
Figure 5:
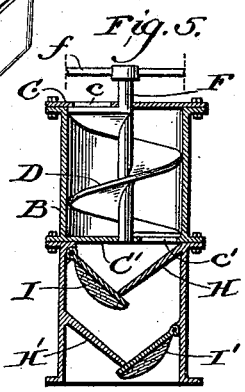
Figure 3:
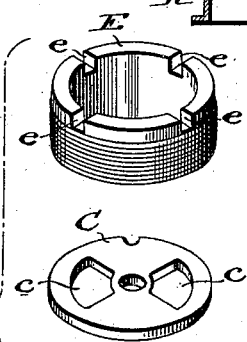
Figure 4:
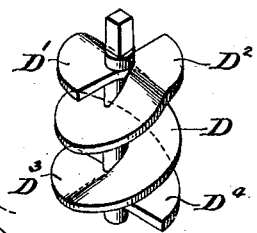
Figure 4:
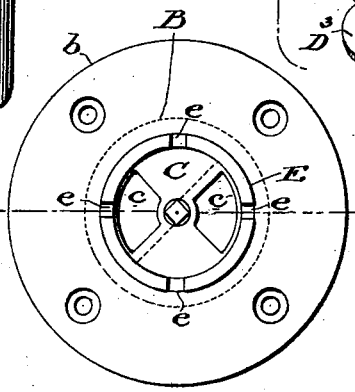

In the drawings: Figure 1 is a perspective view of water pipes and my improved valves applied to a basin or sink. Fig. 2 is a sectional view of my improved valve and valve casing, showing the same connected with a water pipe and basin, the same being a section on the line $x$—$x$, Fig. 4. Fig. 3 represents detached perspective views of screw cap, valve seat and screw valve. Fig. 4 is a plan view of the construction of Fig. 2. Fig. 5 is a view of modified valve apparatus.

In the accompanying drawings: A represents the basin or sink.

G, G', G², are respectively the cold water supply pipe, discharge pipe and hot water supply pipe, which terminate a short distance below the sink.

Valve casings B, B' and B² are attached to pipes G, G' and G² respectively, by means of screw threads on the interior of the casings and exterior of the pipes. The valve casings B, B' and B² have each the top flange $b$, which is adapted to rest upon the floor of the sink and to be secured thereto by means of screws or otherwise. The valve casings B, B', B² and the inclosed valve apparatus do not differ one from the other in construction or mode of operation. I will therefore describe the construction only of the valve in the cold water inlet pipe G.

C, C', are valve seats. I have shown the valve seat C' cast integrally with the valve casing, while valve seat C is a separate plate which rests upon an inside shoulder on the valve casing. The valve stem C is provided with a central orifice for receiving a valve stem F, and is provided also with two oppositely disposed segment shaped orifices $c, c$. The valve seat C' has two corresponding openings $c', c'$, and a central orifice for the valve stem.

E is a cap having an exterior screw thread adapted to engage an interior thread on the casing B, whereby said cap is screwed tightly against the valve seat C and holds the same in place against the shoulder of the valve casing. Screw cap E has radial grooves $e$ to facilitate tightening.

The valve stem F is provided with two spiral flanges or screw valves D, D, terminating at their upper ends in the horizontal quadrant shaped blades D', D², and at their lower ends in the similar blades D³, D⁴. The rim or periphery of these screw valves rests against the inner wall of the valve casing.

When the valve is closed, the valve stem is turned so that the blades D', D², rest immediately under the openings $c, c$, and close the same, while the blades D³, D⁴, rest immediately over and cover the openings $c', c'$. It is obvious that by giving the valve stem a quarter turn by means of the handle $f$, the terminal blades will uncover the openings $c, c, c', c'$, and permit the water to flow from the pipe to the basin. The spiral flanges form a passage between them for the inflowing water. Without the flanges the water would be discharged with unpleasant force, but the flanges compel the water to pass through the valve casing circuitously, thus diminishing the force of the current when it enters the basin.

It is possible to carry out my invention by the use of but one spiral flange, in which case there would be but two terminal blades and but one opening in each of the valve seats.

This valve may be applied not only to supply pipes but to discharge pipes as well. I prefer to fit not only the hot and cold water pipes, but the discharge pipe also, with this form of valve.

In Fig. 5 I have shown my invention in a modified form. The construction here shown is designed to be used in connection with a discharge pipe for ashes or waste material. By its use I am enabled, for instance, to readily dispose of ashes or other waste material on shipboard. In this case the pipe (not shown) would extend through the side or bottom of the vessel into the sea. The valve casing B has secured to it, or integrally formed with it, the valve seats C and C', as in Fig. 2. Each valve seat has, however, but one opening, and the valve stem has but a single flange or screw valve. The terminal blades of the flange are so disposed that when the orifice in one valve seat is closed, the orifice in the other valve seat is open. Beneath the lower valve seat I form with the casing, or rigidly attach thereto, two semi-circular wings or projections H, H', one beneath the other and inclined as shown. I also hinge to the casing the two semi-circular wings I, I', having preferably a body of cork or other light material and a backing of sheet metal, or it may consist of a hollow metal casing. When water from the sea rushes into the pipe or casing, the wings I, I', being light and buoyant, swing upward against the wings H and H', forming thus a check valve to prevent ingress of the water to the upper part of the casing.

In practice, when it is desired to dispose of ashes, &c., the valve stem is turned so that the upper terminal of the spiral flange will uncover the opening c but close the opening c'. The ashes are then deposited in the casing, after which the valve stem is turned so as to close the opening in the upper valve seat and uncover the opening c'. The ashes will then fall through this opening onto wing H, which will deflect them against wing I. The weight of the ashes will cause the wing I to swing downward, allowing the ashes to fall upon wing H', whence they will in turn be deflected against wing I', which yielding will allow the ashes an unobstructed passage to the sea. The advantage of this construction is that it affords not only an easy and convenient means of disposing of ashes and other waste, but at the same time effectually prevents the water from rushing up through the pipe and flooding the hold or fire room.

My valve may be applied to other uses and is capable of other modifications.

Having now fully described my invention, what I claim, and desire to protect by Letters Patent, is—

1. In combination, a valve casing, valve seats, each seat being provided with an orifice, a valve stem having between said valve seats a spiral flange whose rim lies adjacent to the wall of said casing and which terminates at its extremities in blades adapted to fit over said orifices, the said blades being arranged as described whereby turning the stem in one direction opens, and in the other direction closes, both of said orifices, substantially as described.

2. In combination, a valve casing, valve seats, each seat being provided with a segment-shaped orifice, and a valve stem having between said valve seats a spiral flange whose rim lies adjacent to the wall of said casing and which terminates at its extremities in segmental blades adapted to close said orifices, the said blades being arranged as described whereby turning the stem in one direction opens, and in the other direction closes, both of said orifices, substantially as described 3. In combination, a valve casing, valve seats, each seat being provided with two segment-shaped orifices, and a valve stem having between said valve seats two spiral flanges so arranged as to form a passage for the water between them, and which terminate at their extremities in segmental blades adapted to close said orifices, the said blades being arranged as described whereby turning the stem in one direction opens, and in the other direction closes, all of said orifices, substantially as described.

4. In combination, the upright casing B, valve seats C and C' provided with orifices, valve stem F having screw valve D provided at its ends with horizontal terminal blades, the distance between said blades being substantially equal to the distance between said valve seats, pipe G and basin A, substantially as described.

In testimony of which invention I have hereunto set my hand.

JAMES FRYE.

Witnesses:
FRANK S. BUSSER,
M. F. ELLIS.